(12) United States Patent
Camiolo et al.

(10) Patent No.: US 12,119,751 B2
(45) Date of Patent: Oct. 15, 2024

(54) DEVICE AND METHOD FOR VOLTAGE DROP COMPENSATION

(71) Applicant: STMicroelectronics (Grenoble 2) SAS, Grenoble (FR)

(72) Inventors: Jean Camiolo, Sassenage (FR); Alexandre Pons, Vizille (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 18/342,159

(22) Filed: Jun. 27, 2023

(65) Prior Publication Data

US 2023/0344357 A1 Oct. 26, 2023

Related U.S. Application Data

(63) Continuation of application No. 17/938,489, filed on Oct. 6, 2022, now Pat. No. 11,870,330, which is a continuation of application No. 16/906,489, filed on Jun. 19, 2020, now Pat. No. 11,469,677.

(30) Foreign Application Priority Data

Jun. 28, 2019 (FR) ........................................ 1907196

(51) Int. Cl.
*H02M 3/335* (2006.01)
*H02M 1/08* (2006.01)

(52) U.S. Cl.
CPC ......... *H02M 3/33553* (2013.01); *H02M 1/08* (2013.01)

(58) Field of Classification Search
CPC .. H02M 1/0025; H02M 1/32; H02M 3/33523; G06F 1/266

See application file for complete search history.

(56) References Cited

U.S. PATENT DOCUMENTS

| | | |
|---|---|---|
| 5,479,090 A | 12/1995 | Schultz |
| 7,106,037 B2 | 9/2006 | Ohtake et al. |
| 7,199,560 B2 | 4/2007 | Cheung et al. |
| 8,044,649 B2 | 10/2011 | Schmeller et al. |
| 11,095,277 B2 | 8/2021 | Pons et al. |
| 11,870,330 B2 * | 1/2024 | Camiolo ................. G06F 1/266 |
| 2016/0118880 A1 | 4/2016 | Motoki |

FOREIGN PATENT DOCUMENTS

| | | |
|---|---|---|
| FR | 2545631 A0 | 1/2013 |
| FR | 3070774 | 3/2019 |

* cited by examiner

*Primary Examiner* — Kyle J Moody
(74) *Attorney, Agent, or Firm* — Slater Matsil, LLP

(57) ABSTRACT

The present disclosure relates to a voltage source device comprising: a voltage converter for generating a supply voltage at an output node of the voltage converter based on a feedback signal provided on a feedback line; at least one switch coupled between the output node of the voltage converter and an output terminal of the voltage source device; and at least one further switch configured to selectively couple the feedback line to: the output node of the voltage converter during a first regulation mode; and to the output terminal of the voltage source device during a second regulation mode.

20 Claims, 5 Drawing Sheets

DEVICE AND METHOD FOR VOLTAGE DROP COMPENSATION

CROSS-REFERENCE TO RELATED APPLICATIONS

This application is a continuation of U.S. patent application Ser. No. 17/938,489, filed Oct. 6, 2022, which is a continuation of U.S. patent application Ser. No. 16/906,489, filed Jun. 19, 2020, now U.S. Pat. No. 11,469,677, issued Oct. 11, 2022, which application claims the benefit of French Application No. 1907196, filed on Jun. 28, 2019, all of which applications are hereby incorporated herein by reference.

TECHNICAL FIELD

The present disclosure relates generally to the field of voltage source devices, and in particular to a circuit and method for the compensation of a voltage drop at the output of a voltage source device.

BACKGROUND

Under the USB (Universal Serial Bus) type C (USB-C) protocol, a device having a USB-C socket may act as a voltage source for another device coupled via the USB-C interface and operating as a sink. According to the USB-C protocol, the voltage level supplied by the source is variable in the range 5 to 20 V.

Prior to the voltage being supplied by the source device, the source and sink devices for example negotiate the voltage level to be supplied. The source device should then maintain the agreed supply voltage level while the cable is connected and the sink is drawing a current. Indeed, if this voltage drops below a certain offset with respect to the agreed level, the sink device risks detecting an undervoltage, leading it to consider that the cable has been unplugged, and resetting the connection, thereby interrupting the voltage supply to the sink device.

A difficulty is that there is generally a non-negligible resistance between the voltage source within the source device, and the load in the sink device. This resistance can lead to a significant voltage drop between the voltage source on the source side, and the load on the sink side.

There is a technical difficulty in compensating for this voltage drop and ensuring that an undervoltage will not be present at the sink.

SUMMARY

It is an aim of embodiments described herein to at least partially address one or more difficulties in the prior art.

According to one aspect, there is provided a voltage source device comprising: a voltage converter for generating a supply voltage at an output node of the voltage converter based on a feedback signal provided on a feedback line; at least one switch coupled between the output node of the voltage converter and an output terminal of the voltage source device; and at least one further switch configured to selectively couple the feedback line to: the output node of the voltage converter during a first regulation mode; and to the output terminal of the voltage source device during a second regulation mode.

According to one embodiment, the voltage source device further comprises a comparator configured to compare a voltage level at the output terminal of the voltage source device with a threshold voltage, and to control the at least one further switch as a function of the comparison.

According to one embodiment, the voltage source device further comprises a control circuit configured to control the at least one further switch to couple the feedback line to the output node of the voltage converter during the first regulation mode, and to control the at least one further switch to couple the feedback line to the output terminal of the voltage source device when the comparator detects that the voltage level at the output terminal of the voltage source device rises above the threshold voltage.

According to one embodiment, the control circuit is further configured to control the at least one further switch to couple the feedback line to the output node of the voltage converter prior to the deactivation of a source voltage enable signal.

According to one embodiment, the voltage source device is configured to vary the threshold voltage based on the level of a source voltage to be provided by the voltage source device.

According to one embodiment, the voltage source device further comprising: a voltage divider coupled between a node of the at least one further switch and a first supply rail, an intermediate node of the voltage divider being coupled via a differential amplifier to the feedback line.

According to one embodiment, the at least one further switch comprises a first switch coupled between the feedback line and the output node of the voltage converter and a second switch coupled between the feedback line and the output terminal of the voltage source device.

According to one embodiment, the voltage source device further comprises: a first voltage divider coupling the output node of the voltage converter to a first supply rail and having a first intermediate node, wherein the first switch is connected between the feedback line and the first intermediate node; and a second voltage divider coupling the output terminal of the voltage source device to the first supply rail and having a second intermediate node, the second switch being connected between the feedback line and the second intermediate node.

According to one embodiment, the voltage source device further comprises: a current source configured to apply a current to a further output terminal of the voltage source device in order to detect a cable voltage drop; and a compensation circuit configured to generate an analog compensation signal based on a voltage at the further output terminal.

According to one embodiment, the voltage source device further comprises a feedback control circuit configured to adjust the feedback signal provided on the feedback line based on the analog compensation signal.

According to a further aspect, there is provided a method of compensating for voltage drop within a voltage source device, the method comprising: generating, by a voltage converter, a supply voltage at an output node of the voltage converter based on a feedback signal provided on a feedback line; coupling the output node of the voltage converter to an output terminal of the voltage source device via at least one switch; coupling, using at least one further switch, the feedback line to the output node of the voltage converter during a first regulation mode; and coupling, using the at least one further switch, the feedback line to the output terminal of the voltage source device during a second regulation mode.

According to one embodiment, the method further comprises: comparing a voltage level at the output terminal of the voltage source device with a threshold voltage; and controlling the at least one further switch as a function of the comparison.

According to one embodiment, controlling the at least one further switch as a function of the comparison comprises: controlling the at least one further switch to couple the feedback line to the output node of the voltage converter during the first regulation mode; and controlling the at least one further switch to couple the feedback line to the output terminal of the voltage source device when the voltage level at the output terminal of the voltage source device rises above the threshold voltage.

According to one embodiment, controlling the at least one further switch as a function of the comparison further comprises: controlling the at least one further switch to couple the feedback line to the output node of the voltage converter prior to the deactivation of a source voltage enable signal.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

Unless specified otherwise, the expressions "around", "approximately", "substantially" and "in the order of" signify within 10%, and preferably within 5%.

Figure 1:
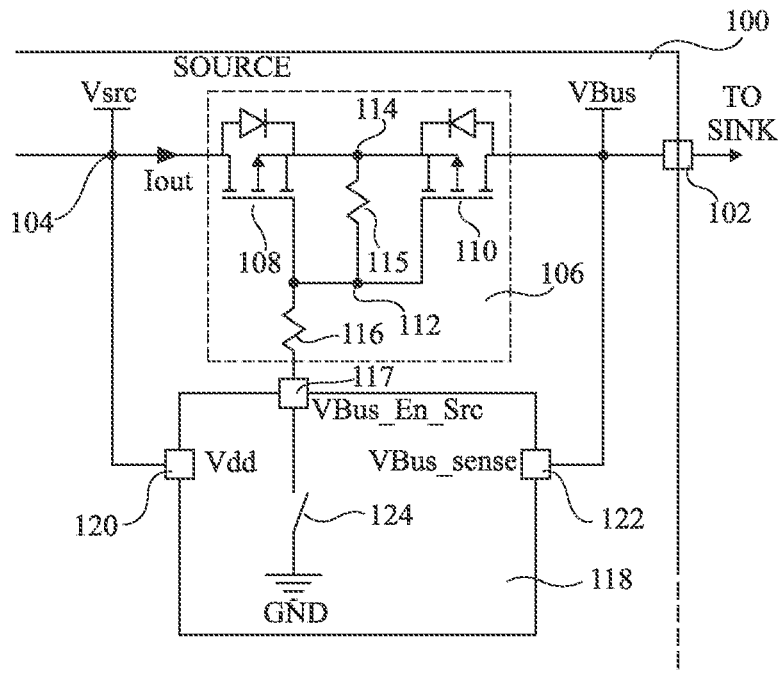
FIG. 1 is a circuit diagram of part of a voltage source device capable of providing a cold socket.

FIG. 1 is a circuit diagram of part of a source device (SOURCE) 100 capable of providing a cold socket. For example, the source device 100 is acting as a voltage source to a sink device (TO SINK—not illustrated in FIG. 1) over an interface such as a USB-C interface that includes a terminal 102 via which a supply voltage VBus is supplied, and a cable (not illustrated).

A voltage Vsrc is generated at a node 104 in the source device 100, for example by a voltage converter (also not illustrated in FIG. 1). In order to assure a so-called "cold socket" at the terminal 102, in other words a low voltage until the supply voltage is to be applied, a switch 106 is provided between the Vsrc node 104 and the terminal 102. The switch 106 isolates the node 104 from the terminal 102 until a source enable signal VBus_En_Src is asserted.

The switch 106 for example comprises a pair of p-channel MOS (PMOS) transistors 108, 110 coupled in series via their sources/drains between the node 104 and terminal 102. The gates of the transistors 108, 110 are for example both coupled to a node 112, which is further coupled to an intermediate node 114 between the transistors 108, 110 via a resistor 115, and to a node 117 at which is provided the enable signal VBus_En_Src. For example, each transistor 108, 110 has its source connected to the intermediate node 114, and an intrinsic diode of each transistor is represented in FIG. 1. A bulk connection of each transistor 108, 110 is for example coupled to the node 114.

The node 117 is for example an output node of a VBus enable circuit 118, which for example has a supply voltage Vdd input node 120 coupled to the Vsrc node 104 in order to power the circuit 118, and a node VBus_sense 122 coupled to the output terminal for receiving the voltage VBus. The enable circuit 118 for example comprises a switch 124 coupling the node 117 to ground in order to assert the enable signal VBus_En_Src after verification that there is no voltage being applied to the terminal 102. Indeed, as the USB-C interface can permit devices to operate as both sources and sinks, this verification is for example performed in order to prevent voltage converters at both the source and sink from being coupled at the same time to the voltage bus VBus of the USB cable. This verification also for example ensures that capacitors on both the sink and source devices have been properly discharged after a previous connection. Otherwise, it would be possible for example that a capacitor of the source or sink device that has been charged at 20 V from a previous negotiation is connected to a source at 5 V.

The present inventors have noted that, while each of the transistors 108, 110 of the switch 106 can have a relatively low ON resistance of around 10 to 20 mΩ each, leading to an overall ON resistance of the switch 106 of around 20 to 40 mΩ, for relatively high currents there can still be a relatively high voltage drop across the switch 106. For example, a current of 3 A could cause a voltage drop of around 60 to 120 mV.

Furthermore, while not illustrated in FIG. 1, a shunt resistor is often provided in the current path between the Vsrc node 104 and the output terminal 102 in order to monitor the current delivered by the source. While this resistance is also relatively low, for example of between 10 and 25 msΩ, for a current of 3 A, this can represent a further voltage drop of between 30 and 75 mV.

Particularly when combined with the voltage drop in the USB-C cable, at relatively high currents, these voltage drops can lead to an under-voltage detection at the sink side.

Figure 2:
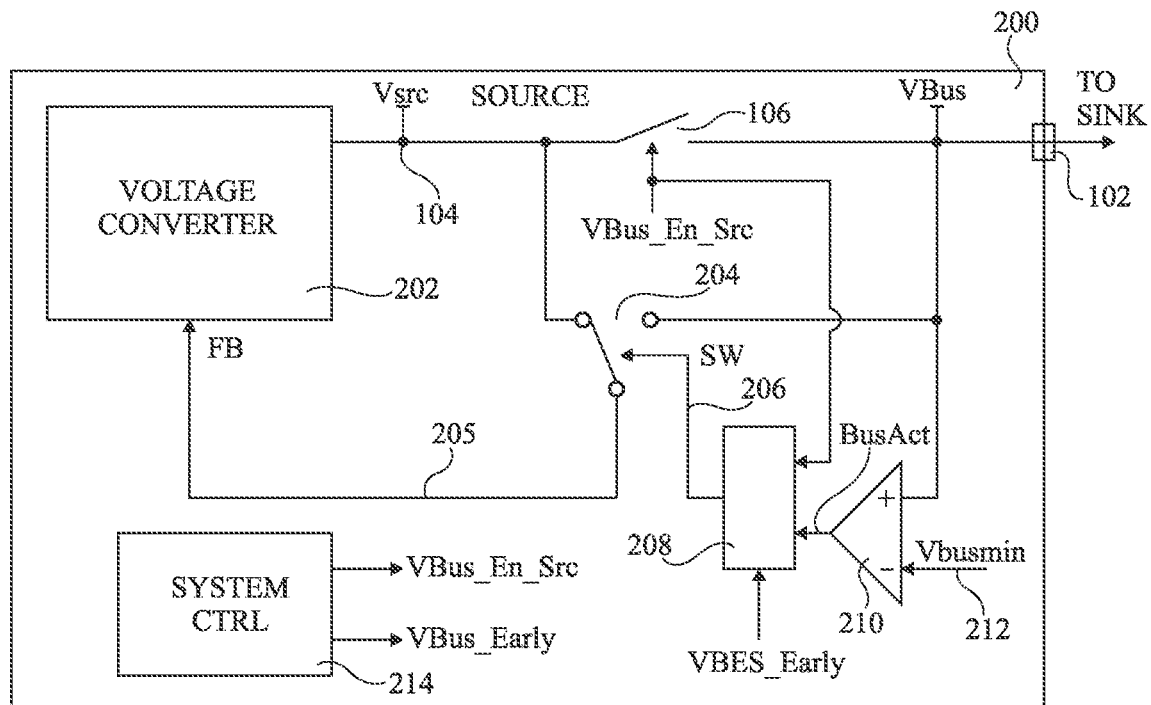
FIG. 2 is a circuit diagram of a voltage source device with voltage drop compensation according to an example embodiment of the present disclosure.

FIG. 2 is a circuit diagram of a voltage source device (SOURCE) 200 providing voltage drop compensation according to an example embodiment of the present disclosure. The device 200 for example comprises many features in common with the device 100 of FIG. 1, and these features have been labelled in FIG. 2 with like reference numerals and will not be described again in detail.

The switch 106 in the device 200 is for example implemented as shown in FIG. 1, although in alternative embodiments it could be implemented by a single transistor, such as a single PMOS transistor.

The device 200 for example comprises a voltage converter (VOLTAGE CONVERTER) 202 configured to generate the voltage Vsrc at the node 104. For example, the voltage converter 202 is a DC to DC converter, or an AC to DC converter.

The device 200 further comprises a switch 204, which is for example an SPDT (single pole, double throw) switch. The switch 204 is configured to couple one or the other of the node 104 and the terminal 102 to a feedback line 205. The feedback line 205 for example provides a feedback signal FB to the voltage converter 202.

In some embodiments, this feedback signal FB is used to adjust an amount of power transferred by the voltage converter 202, for example by adjusting a duty cycle of the converter 202, and/or by regulating an amount of power transferred by a transformer of the voltage converter 202.

Thus, the switch 204 permits the point of regulation used for regulating the voltage converter 202 to be selected as either the voltage Vsrc at the node 104, or the voltage VBus at the terminal 102.

The switch 204 is for example controlled by a control signal SW provided on a line 206 by a control circuit 208. The control circuit 208 for example receives the source enable signal VBus_En_Src, which also controls the switch 106, a bus active signal BusAct from a comparator 210, and a signal VBES_Early, corresponding for example to an early version of the signal VBus_En_Src. For example, the signal VBus_En_Src is delayed with respect to the signal VBES_Early.

The comparator 210 for example has a positive input coupled to the output terminal 102 of the voltage source device 200, and a negative input coupled to receive a reference voltage Vbusmin on a line 212, for example generated by a DAC (Digital to Analog Converter—not illustrated). In some embodiments, the signal VBus_EN_Src is asserted low, and the control circuit 208 asserts the signal SW when the signal VBus_En_Src is asserted and when the voltage VBus at the terminal 102 has risen above the threshold level Vbusmin, and brings low the signal SW when the signal VBES_Early is asserted, indicating for example that the cable has been detached and thus the voltage source is to be disabled.

The signals VBus_En_Src and VBES_Early are for example generated by a system control circuit (SYSTEM CTRL) 214 of the voltage source device 200.

Operation of the circuit of FIG. 2 will now be described in more detail with reference to FIGS. 3 and 4.

Figure 3:
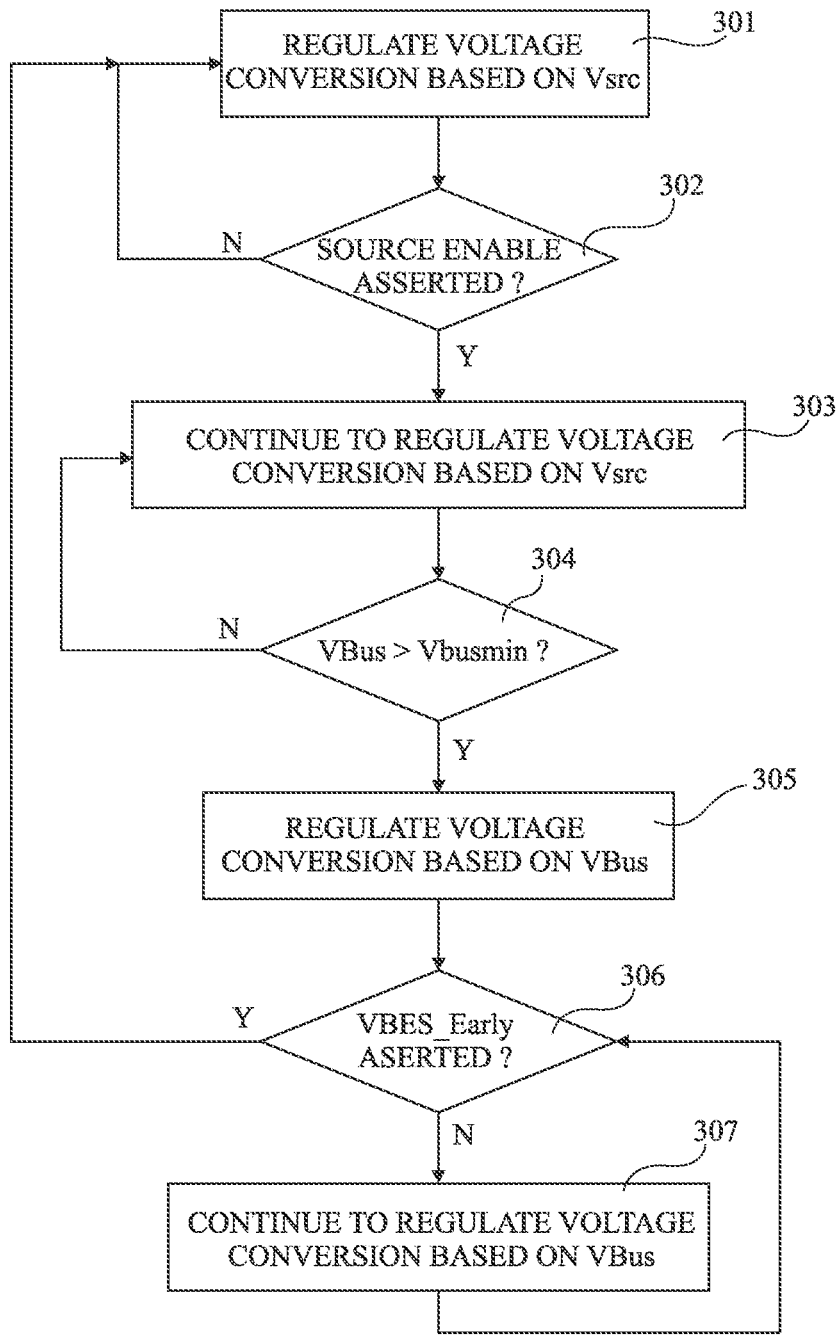
FIG. 3 is a flow diagram illustrating operations in a method of voltage drop compensation according to an example embodiment of the present disclosure.

FIG. 3 is a flow diagram illustrating operations in a method of voltage drop compensation according to an example embodiment of the present disclosure. This method is for example implemented by the comparator 210, control circuit 208 and switch 206 of the device 200 of FIG. 2, although in alternative implementations it could be implemented at least partially by other circuits, such as a finite state machine.

Figure 4:
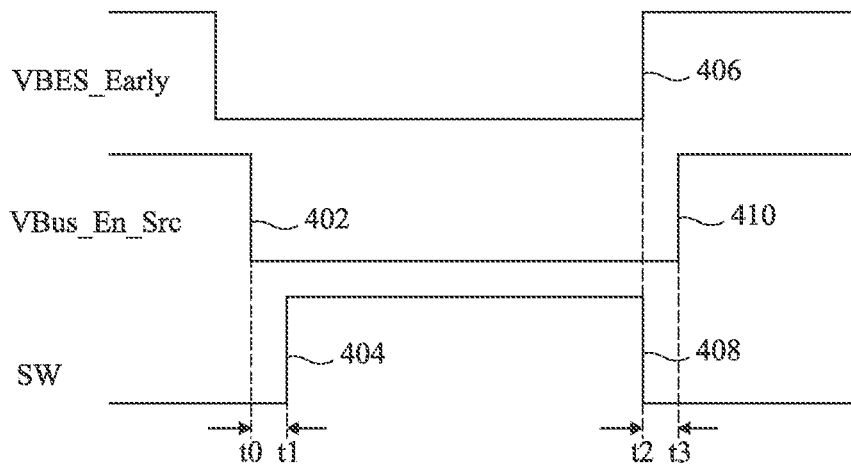
FIG. 4 is a timing diagram representing signals in the device of FIG. 2 according to an example embodiment of the present disclosure.

FIG. 4 is a timing diagram illustrating examples of the signal VBES_Early, the source enable signal VBus_En_Src and the switch control signal SW.

It is initially assumed that no cable is attached to the source device 200. Thus, the signal VBus_En_Src is deactivated, corresponding to a high state in the example of FIGS. 2 to 4, and the switch 106 is open and non-conducting.

In an operation 301, the voltage conversion provided by the converter 202 is regulated, during a first regulation mode, based on the voltage Vsrc at the node 104 while the cable is not attached. For example, the switch 204 couples the node 104 to the feedback line 205. This for example corresponds to a low state of the switch control signal SW. In some embodiments, the voltage Vsrc is regulated at a default safe voltage of 5 V in this state.

In an operation 302, it is for example determined whether the source enable signal VBus_En_Src has been asserted. If not, the regulation continues to be based on the voltage Vsrc. Indeed, the control circuit 208 for example keeps the signal SW low while the signal VBus_En_Src is not asserted. When the source enable signal VBus_En_Src is asserted, the next operation is 303. In the example of FIG. 4, the signal VBus_En_Src is asserted at a time to by a falling edge 402.

In the operation 303, the power path is closed by the activation of the signal VBus_En_Src, but the sink is not yet drawing a current. The voltage conversion provided by the converter 202 continues to be regulated, in the first regulation mode, based on the voltage Vsrc at the node 104. Indeed, the signal SW continues to be low in the example of FIG. 4. In some embodiments, the voltage conversion continues to be regulated for a minimum time duration tcheck after the activation of the signal VBus_En_Src, thereby allowing a decoupling capacitor (not illustrated in FIG. 2) at the output terminal 102 to be charged. In some embodiments, the duration tcheck is of between 50 and 200 µs, and for example around 100 µs.

In an operation 304, it is determined by the comparator 210 whether the voltage VBus has risen above the threshold level VBusmin. This threshold level VBusmin is for example equal to between 3 and 4.8 V, and for example around 4 V. Alternatively, this threshold level VBusmin is between 5% and 40% lower than the negotiated voltage level to be provided by the source device. For example, the threshold level VBusmin is selected to have the following levels based on the PDO (Power Data Object) supply voltage:

TABLE 1

| PDO | 5.1 V | 9 V | 12 V | 15 V | 20 V |
|---|---|---|---|---|---|
| Vbusmin | 3.595 V | 7.3 V | 10.15 V | 13 V | 17.75 V |

While VBus is below Vbusmin, the voltage conversion for example continues to be regulated, in the first regulation mode, based on the voltage Vsrc. This for example prevents, in the case of a defect in the power path, the voltage converter from entering into an open loop, which could damage the entire system.

Once the voltage VBus has risen above Vbusmin, in an operation 305, the regulation of the voltage conversion is switched to a second regulation mode in which it is based on the voltage VBus. For example, the signal SW is asserted by the control circuit 208 of FIG. 2, and the switch 204 couples the output terminal 102 to the feedback line 205. In the example of FIG. 4, the signal SW is asserted at a time t1 by a rising edge 404. The regulation is then performed based on VBus, and thus the voltage Vsrc is for example regulated such that:

$$Vsrc = VBus + (Rdson + RShunt) * Icharge$$

where Rdson is the ON resistance of the switch 106, RShunt is the resistance of any shunt resistor present in the power path for current monitoring purposes, and Icharge is the current provided by the voltage converter 202.

In some embodiments, the time interval between t0 and t1 is at least equal to the minimum time duration tcheck.

Advantageously, by switching the regulation point from the voltage Vsrc to the voltage VBus, regulation is performed, during the second regulation mode, based on the voltage after the switch 106, and thus the voltage drop across this switch is compensated. However, the regulation point of the voltage converter 202 does not switch from the voltage Vsrc to the voltage VBus until both the source enable signal VBus_En_src has been asserted, and the voltage VBus has risen above the threshold Vbusmin. This for example prevents the regulation point from switching to the terminal 102 while the switch 106 is not properly conducting, which could result in undesirable open loop control of the voltage converter 202.

Referring again to FIG. 3, in an operation 306, it is for example determined whether the signal VBES_Early is asserted. The signal VBES_Early is for example asserted if a cable detachment is detected or the source power supply is otherwise to be interrupted. Such a detection is known in the art, and is for example based on a voltage measured at a CC terminal of the USB-C socket, described in more detail below. If the signal VBES_Early has not been asserted, in an operation 307, the voltage conversion continues to be regulated in the second regulation mode based on the voltage VBus, and then the operation 306 is repeated. When the signal VBES_Early is asserted, indicating the imminent deactivation of the source enable signal VBus_En_Src, the method for example returns to operation 301 in which the first regulation mode is returned to and the regulation point is switched back to the voltage Vsrc at the node 104.

In the example of FIG. 4, the signal VBES_Early is asserted by a rising edge 406 at a time t2, causing the signal SW to be deactivated shortly thereafter, with a falling edge 408. The signal VBus_En_Src is then deactivated with a rising edge 410 at a time t3. In some embodiments there is a minimum time duration between t2 and t3 that depends on the application, and in particular on the speed at which the power path opens, and the speed of the regulation loop.

Figure 5:
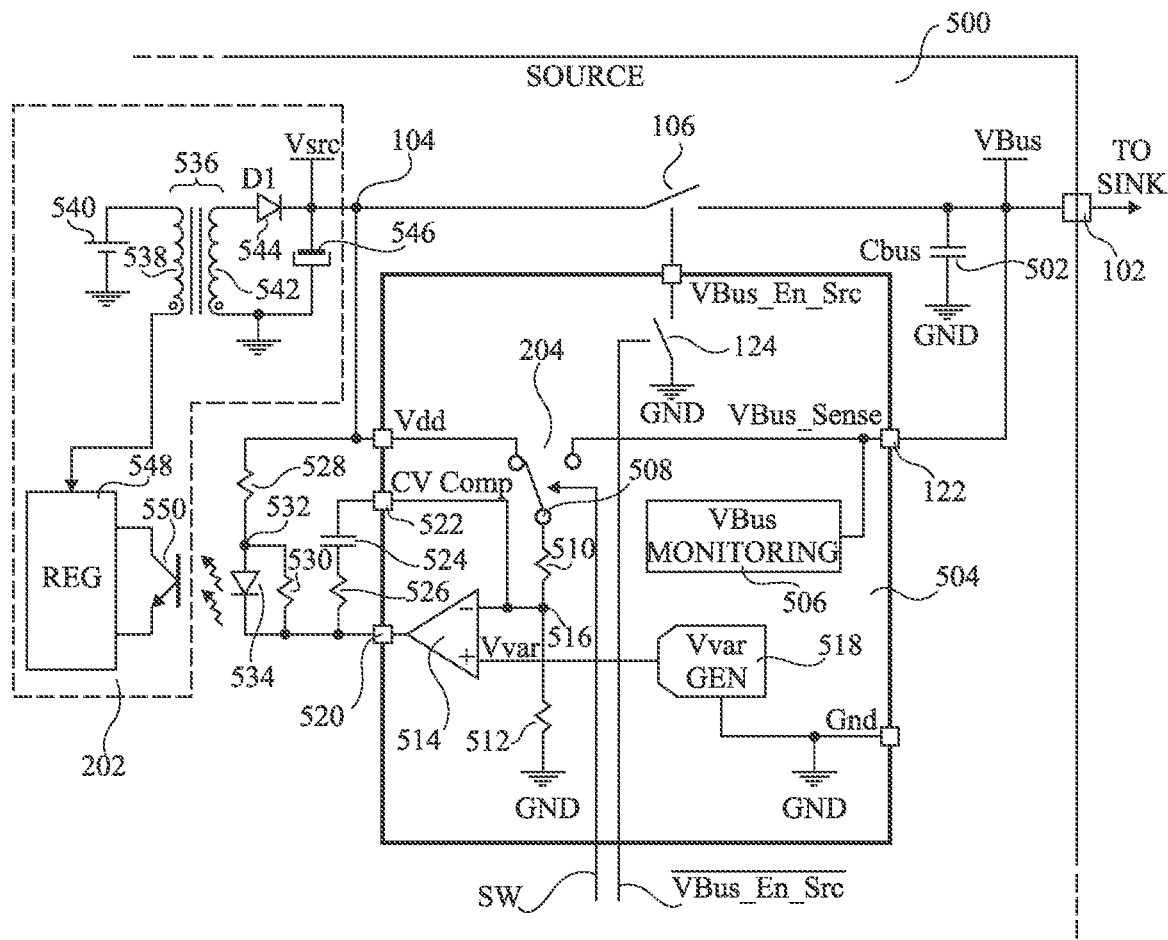
FIG. 5 is a circuit diagram representing a voltage source device according to a further example embodiment of the present disclosure.

FIG. 5 is a circuit diagram representing a voltage source device (SOURCE) 500 according to a further example embodiment. The device 500 for example comprises many features in common with the device 200 of FIG. 2, and these features have been labelled in FIG. 5 with like reference numerals and will not be described again in detail.

In FIG. 5, a decoupling capacitor 502 of capacitance Cbus is for example coupled between the voltage terminal 102 and ground.

The voltage source device 500 for example comprises a circuit 504 comprising the switch 124 generating the source enable signal VBus_En_Src, this switch 124 for example being implemented by an n-channel MOS (NMOS) transistor controlled by the inverse of the signal VBus_En_Src.

The circuit 504 also for example comprises:
- a VBus monitoring circuit (VBus MONITORING) 506, which for example verifies that the voltage VBus is in a correct range, and does not present an under or overvoltage;
- the switch 204, which in the example of FIG. 5 has a terminal 508 that is selectively coupled to either the voltage Vsrc at the node 104, or the voltage VBus at the terminal 102;
- a voltage divider comprising resistors 510 and 512 coupled in series between the node 508 and ground;
- a differential amplifier 514 having its negative input coupled to an intermediate node 516 of the voltage divider between the resistors 510 and 512, and its positive input receiving a voltage Vvar; and
- a circuit (Vvar GEN) 518 for generating the voltage Vvar.

The voltage Vvar represents the supply voltage to be provided by the voltage source device 500 at the output terminal 102, this voltage for example being generated by a DAC (not illustrated) based on a digital input signal.

The output of the differential amplifier 514 is coupled to an output node 520 of the circuit 504. The intermediate node 516 is also coupled to an output node 522 of the circuit 504 providing a signal CV_Comp, and the node 522 is for example coupled to the node 520 via a feedback path comprising the series connection of a capacitor 524 and a resistor 526. The Vsrc node 104 is also coupled to the output node 520 of the circuit 504 via a voltage divider formed by the series connection of resistors 528 and 530. An intermediate node 532 between the resistors 528, 530 is for example coupled to the anode of an LED (Light Emitting Diode) 534 forming the transmitter of an opto-coupler, the cathode of the LED 534 being coupled to the output node 520. The differential amplifier 514 controls the current flowing through the LED 534, and the opto-coupler provides a feedback signal to the voltage converter 202, as will now be explained.

The voltage converter 202 in the embodiment of FIG. 5 is an AC to DC converter comprising a transformer 536 having a primary winding 538 having one end coupled to an AC supply voltage 540, for example at a voltage of 200 to 400 V. The transformer 536 has a secondary winding 542 having one end coupled to the node 104 via a diode 544, and its other end coupled to ground. A capacitor 546 is for example coupled between the node 104 and ground.

The other end of the primary winding 538 is for example coupled to a regulator (REG) 548 that regulates the amount of power transferred by the transformer 536. For example, the regulator 548 includes a phototransistor 550 forming a receiver of the opto-coupler and configured to receive the optical signal generated by the LED 534. The phototransistor 550 conducts a current as a function of the intensity of the optical signal.

In some embodiments, in addition to providing voltage drop compensation for the voltage drop across the switch 106, the voltage source device is also configured to provide voltage drop compensation for a voltage drop over the cable coupling the source and sink devices. Such compensation is described in more detail in U.S. Pat. No. 11,095,277, issued Aug. 17, 2021, in the name of the present applicant, having the same inventors, and having a same priority date as the present application of Jun. 28, 2019, the contents of which is hereby incorporated by reference to the extent permitted by the law. A system capable of providing both types of voltage drop compensation will now be described in more detail with reference to FIG. 6.

Figure 6:
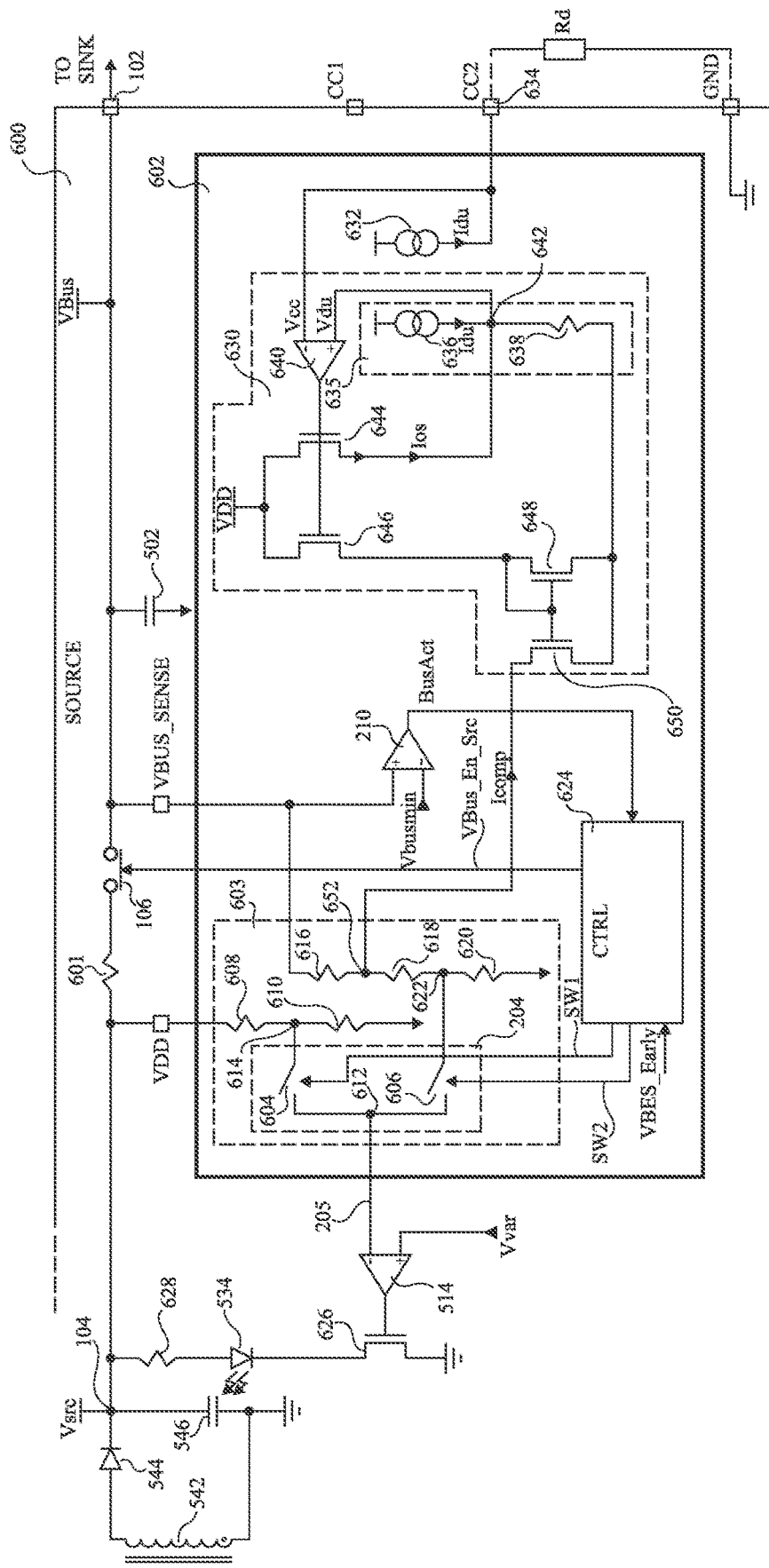
FIG. 6 is a circuit diagram representing a voltage source device according to yet a further example embodiment of the present disclosure.

FIG. 6 is a circuit diagram representing a voltage source device (SOURCE) 600 according to a further example embodiment. The device 600 for example comprises some features in common with the devices 200 of FIGS. 2 and 500 of FIG. 5, and these features have been labelled in FIG. 6 with like reference numerals and will not be described again in detail.

The voltage source device 600 in the example of FIG. 6 includes a shunt resistor 601 coupled between the switch 106 and the output node 104 of the voltage converter. This shunt resistor is for example used for current monitoring purposes, the current monitoring circuit not being illustrated in FIG. 6.

The voltage source device 600 comprises a circuit 602 comprising a regulation point selection circuit 603 comprising switches 604 and 606 implementing the switch 204. The circuit 603 further comprises a voltage divider formed of resistors 608 and 610 coupled in series between the node 104 and ground. The switch 604 is coupled between a node 612 and an intermediate node 614 between the resistors 608 and 610. The circuit 603 also comprises a voltage divider formed of resistors 616, 618 and 620 coupled in series between the output terminal 102 and ground. The switch 606 is for example coupled between the node 612 and an intermediate node 622 between the resistors 618 and 620. The switches 604 and 606 are for example respectively controlled by signals SW1 and SW2 generated by a control circuit (CTRL) 624, these signals together forming the control signal SW in the example of FIG. 6. The control circuit 624 also for example generates the source enable signal VBus_En_Src, and receives the signal VBES_Early, and the bus active signal BusAct from the comparator 210.

The node 612 for example provides the feedback line 205, and is for example coupled to the negative input of the differential amplifier 514, which in the embodiment of FIG. 6 has its output coupled to the control node of a transistor 626. The positive input of the differential amplifier 514 for example receives the voltage Vvar. The transistor 626 for example has one of its main conducting nodes coupled to ground, and its other main conducting node coupled to the node 104 via the LED 534 and a resistor 628. For example, while only partially illustrated in FIG. 6, a voltage converter similar to the converter 202 of FIG. 5 is provided.

The circuit 602 also for example comprises a current source 632 that applies a current Idu to an output terminal 634 of the device 600. For example, the device 600 comprises, in addition to the VBus and GND terminals, further terminals CC1 and CC2 coupled to the wires of the cable when attached. The terminals CC1 and CC2 are for example configuration channels. The terminal CC2 is for example used for detecting the presence of a cable, and is coupled on the sink side to the ground wire of the cable via a pull-down resistor Rd.

The circuit 602 also for example comprises a voltage drop compensation circuit 630 for compensating for the voltage drop over the cable, and in particular between the output terminal 102 and the load within the sink device (not illustrated in FIG. 6), based on the voltage Vcc at the terminal 634.

The circuit 630 for example comprises a dummy circuit 635 comprising a dummy current source 636 and a dummy resistor 638 coupled in series between the supply voltage VDD and ground. The current sources 636 and 632 are for example configured to conduct substantially the same current Idu. The resistance Rdu of the resistor 638 is for example equal to around the minimum level of the resistor Rd that is authorized by the USB-C standard, which is for example a resistance of 5.1 k-5%. A differential amplifier 640 is configured to amplify a difference in the voltage Vcc at the output terminal 634 with respect to the voltage Vdu at the intermediate node 642 between the dummy current source 636 and the dummy resistor 638. For example, the differential amplifier 640 has its negative input coupled to the terminal 634, and its positive input coupled to the node 642. The output of the differential amplifier 640 is for example coupled to the control nodes of a pair of transistors 644 and 646, which are for example PMOS transistors.

The transistor 644 is coupled by its main conducting nodes between the supply rail VDD and the intermediate node 642 of the dummy circuit 634. The transistor 644 is controlled to conduct an offset current Ios, which is injected into the resistor 638.

The transistor 646 also for example conducts a current, equal to or proportional to the current Ios, which is for example mirrored by a current mirror to generate a current Icomp. The current mirror for example comprises an NMOS transistor 648 coupled by its main conducting nodes between the transistor 646 and ground, and a transistor 650 coupled by its main conducting nodes to an intermediate node 652 between the resistors 616 and 618 of the regulation point selection circuit 603 and ground. The control nodes of the transistors 648, 650 are for example coupled together and to the drain of the transistor 648. Thus, the current Icomp is drawn from the intermediate node 652. For example, the current Icomp is equal to $\alpha*Ios$, where a is a ratio resulting from size ratios between the transistors 644, 646 and/or between the transistors 648, 650.

In operation, when a cable is attached, the differential amplifier 640 regulates the voltage Vdu across the dummy resistor 638 by controlling the offset current Ios. When no load is present on the sink side, the voltage VBus is for example at a no load value VBus0, and the voltage Vdu will equal the voltage Vcc. Thus, no load values Ios0 and Icomp0 of the offset current Ios and compensation current Icomp will be conducted, where:

$$Ios0=Idu*(Rd/Rdu-1)$$

and $$Icomp0=\alpha*Idu*(Rd/Rdu-1)$$

When a load is applied, a voltage drop will appear over the cable ground wire GND, and thus the voltage Vdu will rise to Vcc+Rgnd*Icable, where Rgnd is the resistance of the ground cable, and Icable is the current flowing through the cable. It follows that the offset current Iso, and compensation current Icomp, will rise as follows:

$$Iso=Iso0+Rgnd/Rdu*Icable$$

$$Icomp=Icomp0+\alpha*Rgnd/Rdu*Icable$$

The compensation current Icomp is fed into the regulation loop, for example via the intermediate node 652, and creates an offset such that:

$$VBus=VBus0+Rcomp*Icomp0+\alpha*Rcomp*Rgnd/Rdu*Icable$$

where Rcomp is the resistance of the resistor 616.

The ground wire of the cable for example has half the resistance of the VBus wire, and thus in some embodiments the value of a and of the resistances Rcomp and Rdu are chosen such that:

$$\alpha*Rcomp/Rdu=2$$

Thus:

$$VBus=VBus0+Rcomp*Icomp0+2*Rgnd*Icable$$

Figure 7:
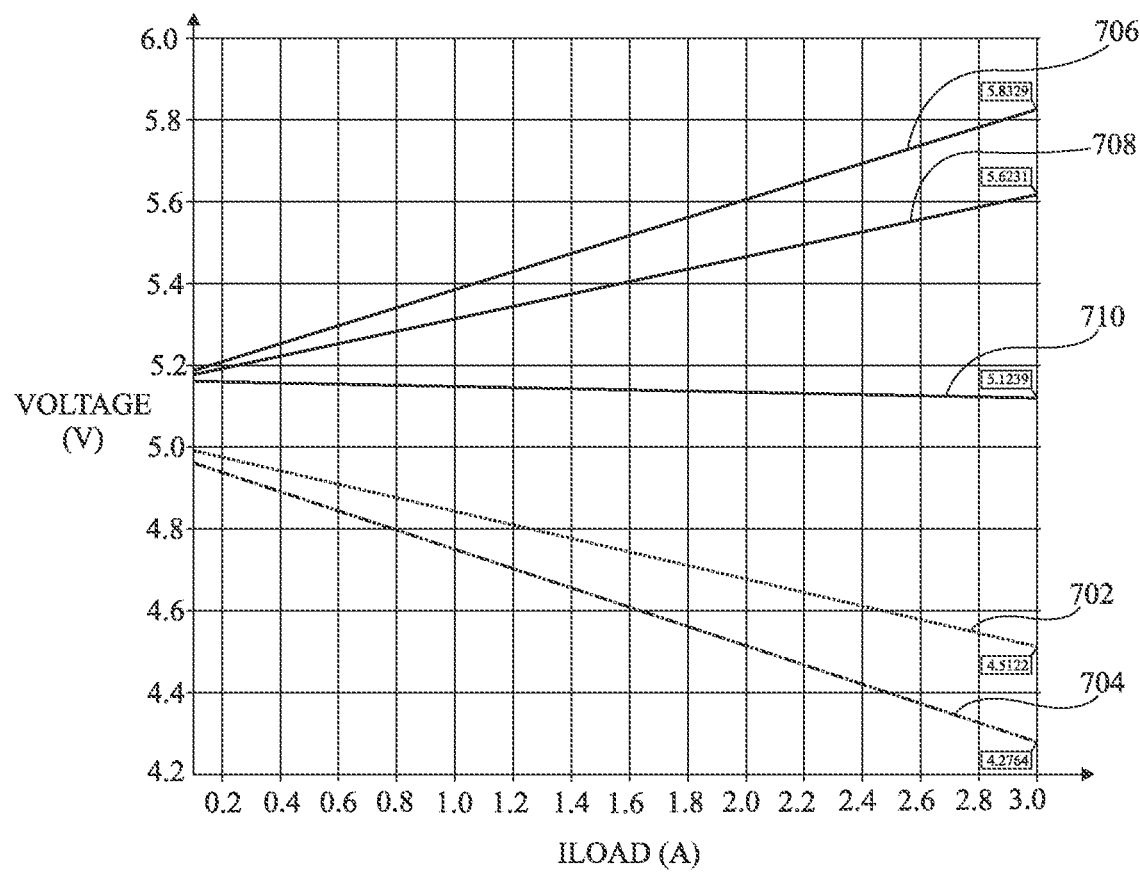
FIG. 7 is a graph representing an example of voltages in the voltage source device of FIG. 6 and in an attached sink device.

FIG. 7 is a graph of simulated voltages in the voltage source device 600 of FIG. 6 and a corresponding sink device as a function of the load current.

A curve 702 represents the voltage VBus at the source side in the case that there is no voltage drop compensation, and assuming a voltage Vsrc of 5 V. It can be seen that, for a current of 1 A, the voltage VBus at the source side falls to around 4.85 V, and for a current of 3 A, the voltage VBus at the source side falls to around 4.5 V.

A curve 704 represents the voltage VBus at the sink side in the case that there is no voltage drop compensation, and assuming a voltage Vsrc of 5 V. It can be seen that, with the added voltage drop across the cable, for a current of 1 A, the voltage VBus at the sink side falls to around 4.75 V, and for a current of 3 A, the voltage VBus at the sink side falls to around 4.25 V. Such a voltage could be detected as an under-voltage by the sink device.

A curve 706 represents the voltage Vsrc after voltage drop compensation of both the voltage drop across the switch 106 and the voltage drop in the cable. For a current of 1 A, the Vsrc voltage is now at around 5.4 V, and for a current of 3 A, the Vsrc voltage is now at around 5.85 V.

A curve 708 represents the voltage VBus on the source side with the Vsrc voltage of the curve 706. For a current of 1 A, the voltage VBus is now at around 5.3 V, and for a current of 3 A, the voltage VBus is now at around 5.6 V.

A curve 710 represents the voltage VBus on the sink side with the Vsrc voltage of the curve 706. For a current of 1 A, the voltage VBus at the sink side is now at around 5.15 V, and for a current of 3 A, the voltage VBus at the sink side is now at around 5.1 V. These levels are sufficiently high not to be considered as under-voltages at the sink side, and are even slightly higher than the target level of 5 V.

An advantage of the embodiments described herein is that a voltage drop across a switch of the power path of a voltage source device can be compensated while maintaining a stable regulation of the supply voltage.

Various embodiments and variants have been described. Those skilled in the art will understand that certain features of these embodiments can be combined and other variants will readily occur to those skilled in the art. For example, it will be apparent to those skilled in the art that the ground voltage described herein could be replaced by any positive or negative reference voltage that is for example lower than the supply voltages Vsrc and VBus.

Furthermore, the implementation of the switch 204 of FIG. 6 could be used in the embodiments of FIGS. 2 and 5, and the implementation of the switch 106 in FIG. 1 could be used in any of the embodiments of FIGS. 2, 5 and 6.

Furthermore, the various transistors of the various circuits could be implemented by CMOS transistor technologies, or by other transistor technologies, and n-channel transistors could be replaced by p-channel transistors, and vice versa, in alternative implementations.

Furthermore, while a source enable signal VBus_En_Src has been described that is asserted when low, it will be apparent to those skilled in the art that in alternative embodiments this signal could be asserted when high, depending on the particular implementation of the switch 106.

Finally, the practical implementation of the embodiments and variants described herein is within the capabilities of those skilled in the art based on the functional description provided hereinabove. For example, the implementation of various types of DC to DC and AC to DC voltage converter is known to those skilled in the art and has not been described in detail.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A voltage source device comprising:
a voltage converter for generating a supply voltage at an output node of the voltage converter based on a feedback signal provided on a feedback line;
at least one switch configured to selectively connect or isolate the output node of the voltage converter and an output terminal of the voltage source device;
a regulation point selection circuit configured to mutually-exclusively couple the feedback line to:
the output node of the voltage converter during a first regulation mode; or
the output terminal of the voltage source device during a second regulation mode;
a first current source configured to apply a first current to a further output terminal of the voltage source device in order to detect a cable voltage drop; and
a voltage drop compensation circuit configured to generate an analog compensation signal based on a first voltage at the further output terminal.

2. The voltage source device of claim 1, wherein the regulation point selection circuit is further configured to adjust the feedback signal based on the analog compensation signal.

3. The voltage source device of claim 1, wherein the analog compensation signal is configured to compensate for the cable voltage drop.

4. The voltage source device of claim 3, wherein the further output terminal is configured to be coupled to a ground via a pull-down resistor disposed in a voltage sink device.

5. The voltage source device of claim 1, wherein the voltage drop compensation circuit comprises a dummy circuit comprising a dummy current source and a dummy resistor coupled in series between the supply voltage and a ground, and wherein the dummy circuit is configured to generate a dummy current that is substantially the same as the first current.

6. The voltage source device of claim 5, wherein the voltage drop compensation circuit further comprises a differential amplifier configured to amplify a difference in the first voltage at the further output terminal with respect to a second voltage at a first intermediate node between the dummy current source and the dummy resistor, and wherein an output of the differential amplifier is coupled to control nodes of a pair of transistors.

7. The voltage source device of claim 6, wherein a first transistor of the pair of transistors has first conduction terminals coupled between the supply voltage and the first intermediate node of the dummy circuit, and wherein the differential amplifier is configured to control the first transistor to conduct an offset current that is injected into the dummy resistor.

8. The voltage source device of claim 7, wherein a second transistor of the pair of transistors is configured to conduct a second current that is equal to or proportional to the offset current.

9. The voltage source device of claim 8, wherein the voltage drop compensation circuit comprises a current mirror configured to receive the second current and generate the analog compensation signal.

10. The voltage source device of claim 9, wherein the current mirror comprises:
a third transistor having third conduction terminals coupled between the second transistor and the ground; and a fourth transistor having fourth conduction terminals coupled to a second intermediate node disposed between two resistors of the regulation point selection circuit and the ground, wherein control nodes of the third and fourth transistors are coupled together and to a drain of the second transistor.

11. A method of operating a voltage source device, the method comprising:
- isolating an output node of a voltage converter from an output terminal of the voltage source device via at least one switch;
- generating, by the voltage converter, a supply voltage at the output node of the voltage converter based on a feedback signal provided on a feedback line;
- coupling the output node of the voltage converter to the output terminal of the voltage source device via the at least one switch;
- coupling, by a regulation point selection circuit, the feedback line to the output node of the voltage converter, and decoupling, by the regulation point selection circuit, the feedback line from the output terminal of the voltage source device, during a first regulation mode;
- coupling, by the regulation point selection circuit, the feedback line to the output terminal of the voltage source device, and decoupling, by the regulation point selection circuit, the feedback line from the output node of the voltage converter, during a second regulation mode;
- applying, by a first current source, a first current to a further output terminal of the voltage source device in order to detect a cable voltage drop; and
- generating, by a voltage drop compensation circuit, an analog compensation signal based on a first voltage at the further output terminal.

12. The method of claim 11, further comprising adjusting, by the regulation point selection circuit, the feedback signal provided on the feedback line based on the analog compensation signal.

13. The method of claim 11, wherein the analog compensation signal compensates for the cable voltage drop.

14. The method of claim 13, further comprising coupling the further output terminal to a ground via a pull-down resistor by connecting a cable from the voltage source device to a voltage sink device.

15. The method of claim 11, further comprising generating, by a dummy circuit in the voltage drop compensation circuit, a dummy current that is substantially the same as the first current, the dummy circuit comprising a dummy current source and a dummy resistor coupled in series between the supply voltage and a ground.

16. The method of claim 15, further comprising amplifying, by a differential amplifier in the voltage drop compensation circuit, a difference in the first voltage at the further output terminal with respect to a second voltage at a first intermediate node between the dummy current source and the dummy resistor, and controlling, by an output of the differential amplifier a pair of transistors.

17. The method of claim 16, further comprising controlling, by the differential amplifier, a first transistor of the pair of transistors to conduct an offset current that is injected into the dummy resistor, the first transistor having first conduction terminals coupled between the supply voltage and the first intermediate node of the dummy circuit.

18. The method of claim 17, further comprising conducting, by a second transistor of the pair of transistors, a second current that is equal to or proportional to the offset current.

19. The method of claim 18, further comprising receiving, by a current mirror of the voltage drop compensation circuit, the second current, and generating, by the current mirror, the analog compensation signal.

20. The method of claim 19, further comprising:
- controlling, by the differential amplifier, the offset current to regulate the second voltage, in response to a cable being attached to the voltage source device;
- when a load is not present on a voltage sink side of the cable, conducting no-load values of the offset current and the analog compensation signal; and
- when the load is present on the voltage sink side of the cable, increasing the offset current and the analog compensation signal to increase a bus voltage at the output terminal of the voltage source device to compensate for the cable voltage drop.

* * * * *